April 7, 1970 E. J. HAKER 3,504,598
PULVERIZER-MIXER WITH A VIBRATORY TAILBOARD
Filed Jan. 22, 1969 3 Sheets-Sheet 1

INVENTOR
E. J. HAKER

ATTORNEYS

April 7, 1970 E. J. HAKER 3,504,598
PULVERIZER-MIXER WITH A VIBRATORY TAILBOARD
Filed Jan. 22, 1969 3 Sheets-Sheet 2

INVENTOR
E. J. HAKER

BY *Sughrue, Rothwell, Mion, Zinn & Macpeak*

ATTORNEYS

April 7, 1970        E. J. HAKER        3,504,598

PULVERIZER-MIXER WITH A VIBRATORY TAILBOARD

Filed Jan. 22, 1969        3 Sheets-Sheet 3

INVENTOR
E. J. HAKER

BY *Aughure, Rothwell, Mion, Zinn & Macpeak*

ATTORNEYS

United States Patent Office 3,504,598
Patented Apr. 7, 1970

3,504,598
PULVERIZER-MIXER WITH A VIBRATORY TAILBOARD
Edwin J. Haker, Elm Grove, Wis., assignor to Rex Chainbelt Inc., Milwaukee, Wis., a corporation of Wisconsin
Continuation-in-part of application Ser. No. 672,864, Oct. 4, 1967. This application Jan. 22, 1969, Ser. No. 796,943
Int. Cl. E01c 19/02
U.S. Cl. 94—40                  5 Claims

ABSTRACT OF THE DISCLOSURE

A traveling pulverizer-mixer of the type having rotary tines operating within a hood has an adjustable vibratory tailboard for precompaction immediately after pulverizing and mixing. The vibratory tailboard can be raised and lowered as required and additionally some amount of the weight of the pulverizer-mixer may be selectively applied to the vibrating tailboard as desired.

CROSS-REFERENCE TO RELATED APPLICATION

This application is a continuation-in-part of application Ser. No. 672,864 filed Oct. 4, 1967 now abandoned.

BACKGROUND OF INVENTION

Field of invention

This invention relates to traveling pulverizer-mixers of the type having a hood and adjustable tailboard enclosing rotary pulverizing and mixing tines. More specifically, this invention relates to improvements in the tailboard by incorporating thereon a vibratory mechanism and means to impart an adjustable vertical load.

Prior art

Traveling pulverizer-mixers are known in the art and used extensively for soil manipulation, particularly in the construction and maintenance of roads and the like. In these pulverizer-mixers a mobile unit, such as a tractor or wheeled trailer carries a pulverizer-mixer unit adjustably mounted therefrom. The pulverizer-mixer unit includes a rotor having spaced tines thereon which is rotatable within a profiled hood. The rear portion of the hood has a tailboard pivotally mounted therefrom with a power cylinder for adjusting the tailboard up and down to control spill-over action. The tailboard may have any adjustment within a range from closed position for maximum pulverization to a wide open position for full aeration of the pulverized and mixed materials.

These pulverizer-mixers have provided low-cost high-production methods of building base, sub-base and embankment courses by permitting a thorough mixing and pulverizing of native materials, such as sand, clay, loam and inexpensive aggregates. The same mixing action occurs where additives, including moisture, are introduced leaving the stabilized base ready for compaction by a roller or similar means. However, when operating on certain native materials, the pulverizer-mixer, even with the tailgate fully closed, leaves a very loose soft trail of the material behind it. This "fluff" results in a rise in the level of the material equal to about 50% to 75% of the depth of the pulverizer. For making a road, this fluff must be further compacted, usually by several courses or passes of compaction equipment. Until such time as the compaction equipment compacts the fluff, there is a problem of roadability. That is, the fluff is so soft that ordinary vehicles cannot travel on it. This presents a serious problem for residents requiring access to the road, as well as for construction equipment which must utilize the road.

Another problem with having fluff is that of sealing in moisture. In certain road construction operations, losing moisture is a problem. For example, it is desired to keep the soil moist when used with soil cement. If moisture is lost, water has to be hauled in or otherwise obtained at the construction site and this creates additional problems. Furthermore, moisture is needed for optimum compaction. With the loose fluff moisture is lost by evaporation due to the aeration.

Sealing moisture out of the mixed soil often presents problems even more serious than those associated with sealing moisture in. In the same manner that the loose fluff allows moisture to be lost by evaporation, the fluff will readily absorb substantial amounts of water greatly in excess of the optimum required for compaction. A rainfall before the fluff has been compacted can rapidly produce a condition that will completely preclude traffic of any type. In addition, and as is very often the case, it may take days for the soil to dry sufficiently to allow the passage of either ordinary or construction vehicles and the resumption of construction activities.

SUMMARY OF THE INVENTION

This invention provides for precompaction, if required, immediately after pulverizing and mixing and this precompaction is accomplished by a vibrating tailboard. By precompaction immediately after pulverizing and mixing the roadability problem as to both private cars and construction equipment is lessened, since about 80% of the level of the fluff will be compacted, which is sufficient to allow residents and construction equipment to utilize the roadbed surface following the pulverizer-mixer.

Furthermore, in situations where it is desired to retain or preclude moisture, the precompaction by the vibrating tailboard seals the surface and prevents evaporation of moisture and/or entry of additional moisture.

The pulverizer-mixer of this invention has an adjustable ground engaging tailboard which is pivoted from the rear transverse edge of the hood about a low pivot. The tailboard carries a vibratory mechanism and the low pivotal mounting provides a compaction angle closer to the horizontal, allowing more efficient compaction. The compactive effort of the vibrating tailboard is supplemented with means for simultaneously imparting an adjustable vertical load thereto.

Alternately, an intermediate tailboard portion may be interposed and form a double hinge connection between the vibratory tailboard and the hood. The intermediate tailboard portion replaces a portion of the hood including the rear transverse edge and allows the incorporation in the present invention of various functional features of the prior art, including more complete aeration of the soil, if desired, and greater ease in changing or inspecting the tines.

Figure 4:
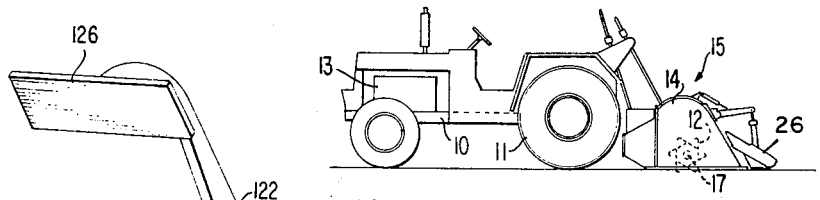
FIG. 4 is a side elevation view of the entire traveling pulverizer-mixer.

Referring to the drawings, a traveling vibratory pulverizer-mixer may be of the known tractor attachment type or trailer type. The tractor type is shown in FIG. 4. It includes a tractor body 10 with wheels 11 and engine 13. A pulverizer-mixer attachment 15 includes a rotary shaft 17 carrying pulverizing and mixing tines 12 rotatably mounted within a profiled hood 14. The hood, which has substantial mass, is connected to the frame and has opposite parallel sides 16 and a curved top 18 with ribs 20 therein. Such pulverizer-mixers are known in the art, and they conventionally include a pivoted tailboard extending downwardly from the rear top portion of the hood to provide an elevatable rear transverse edge.

Figure 1:
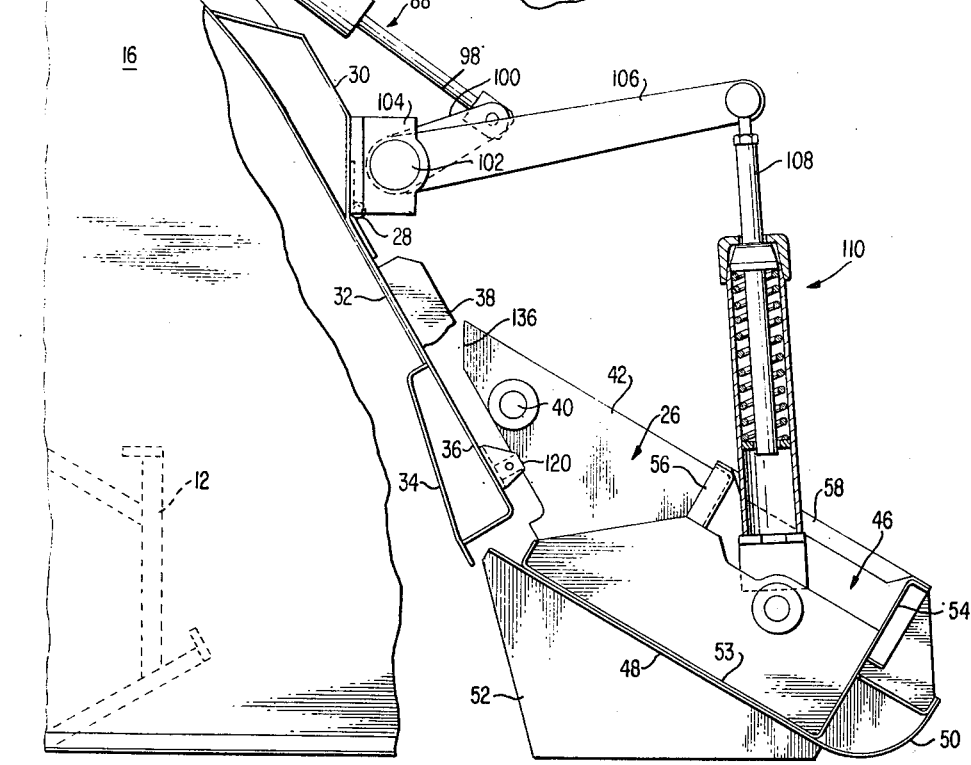
FIG. 1 is a side elevation view of a portion of a pulverizer-mixer showing the vibratory tailboard of this invention.
Figure 2:
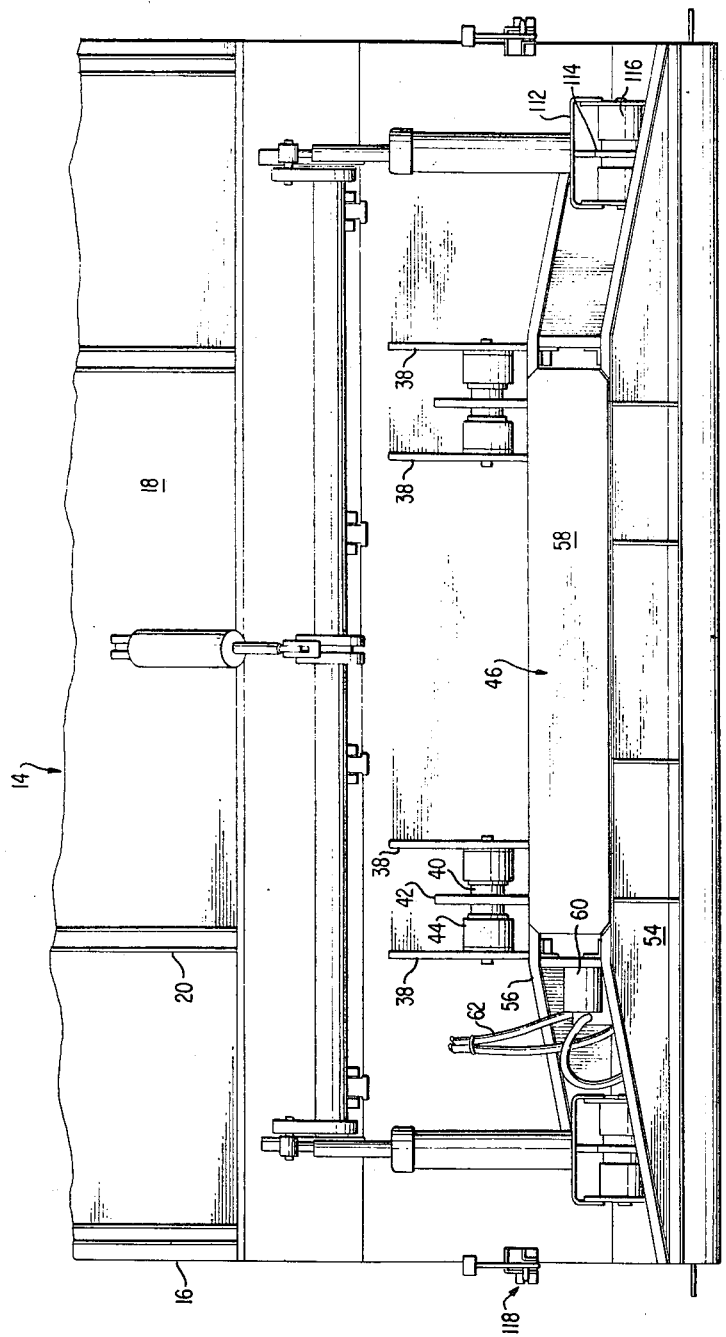
FIG. 2 is a rear elevation view of the vibratory tailboard shown in FIG. 1.

The present invention resides in a unique vibratory tailboard assembly 26 pivotally connected to the hood 14. The hood 14 includes a rearwardly and downwardly extending base plate 32. Base plate 32 comprises an integral tangentially disposed extension of the curved top 18 of the hood 14 and includes a deflector plate 34 and a body plate 36. Extending upwardly from the body plate 36 and welded thereto are shock and pivot support plates 38, see FIGS. 1 and 2.

The vibratory tailboard assembly 26 is pivotally connected to the base plate 32 by a pivot pin 40 which connects arm 42 to the support plates 38 through the intermediary of shear-type shock absorbers 44.

The tailboard 26 carries a vibratory mechanism 46 and has on its lower surface a removable compaction plate 48 which normally extends at a low acute angle to the level of the ground and can be gently curved or include a curved soil engaging end 50. Side plates 52 at each side of the compaction plate 48 keep the pulverized material from spreading laterally outward of the machine. The tailboard 26 includes a back-up plate 53 above the compaction plate having an upwardly extending portion 54 forming a transverse stiffening beam. A spaced stiffening beam 56 sandwiches the vibratory mechanism 46. The vibratory mechanism is covered by a top cover 58.

Figure 5:
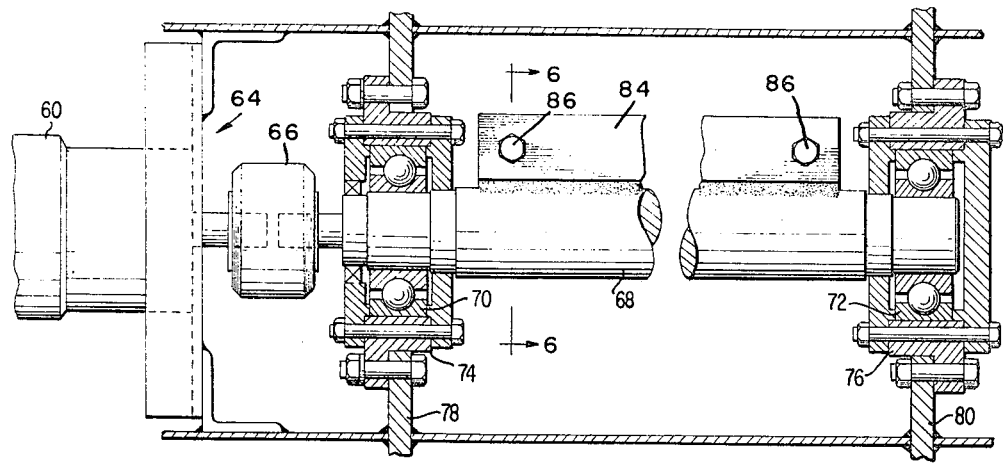
FIG. 5 is a longitudinal sectional view through the vibratory mechanism of the vibratory tailboard.
Figure 6:
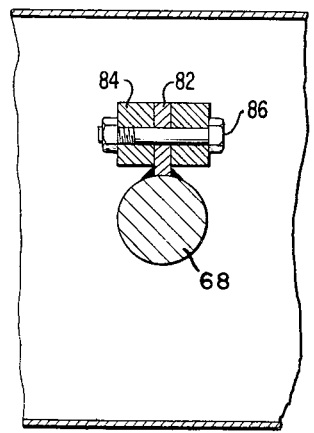
FIG. 6 is a sectional view taken along lines 6—6 of FIG. 5.

Vibration is imparted to the tailboard 26 by the vibratory mechanism 46 which in turn is driven by a vibratory motor 60 which may be of the fluid motor type having fluid lines 62 connected thereto and powered from the engine. Referring to FIG. 5, vibratory mechanism 46 includes a motor bracket 64, a shaft coupling 66 and a vibratory main drive shaft 68. The drive shaft 68 is journaled and sealed in lubricated ball bearings 70 and 72 which in turn are supported on bearing brackets 74 and 76 carried on support plates 78 and 80. A longitudinal rib 82 is welded to shaft 68 and carries weights 84 thereon by means of bolts 86. Rotation of shaft 68 will cause the eccentric weight 84 to vibrate the entire assembly and hence vibrate the tailboard assembly 26 vertically compacting the mixed soil to the degree desired.

Figure 3:
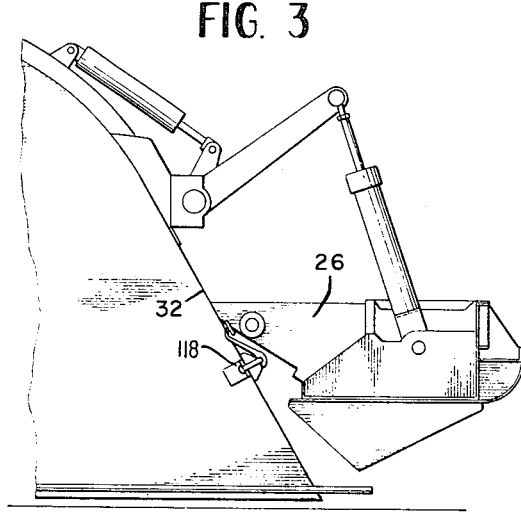
FIG. 3 is a side elevation view similar of FIG. 1 showing the vibratory tailboard in a raised position.

The compactive effect produced by the vibration of the ground engaging surface 50 of the compaction plate 48 may be substantially enhanced if a vertical load is simultaneously applied thereto. The tailboard assembly 26 of this invention has means 88 for resiliently holding the tailboard assembly in preselected position or raising and lowering the tailboard and applying a load to the lower portion. This means includes a reciprocating fluid motor 90 having a cylinder 92 pivotally connected at 94 to hood bracket 96. The piston rod 98 of the motor is connected to lever arm 100 rigidly fixed with rotatable transverse shaft 102 supported in bearings 104. A pair of arms 106 are also rigidly attached to shaft 102 to rotate therewith. The outer ends of arms 106 are connected to rods 108 of compressible spring shock absorbers 110. The lower ends of shock absorbers 110 have a yoke assembly 112, FIG. 2, for attachment to plate 114 of the tailboard assembly. The connection also includes shock absorbers 116 so that the shock of vibration to the tailboard assembly will not be transmitted to the hood. The tailboard assembly 26 has an extension 136 on arm 42 which, when the tailboard assembly is pivoted by the action of the raising means 88, will bear on the surface of the hood at plate 36, as shown in FIG. 3.

Figure 7:
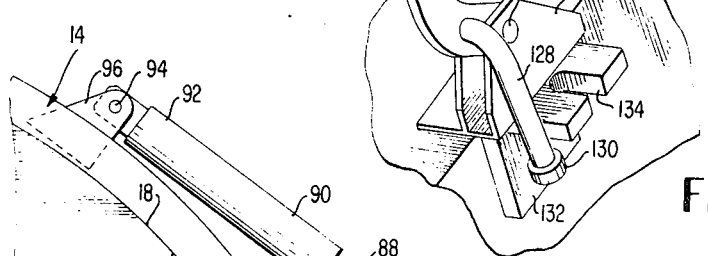
FIG. 7 is a perspective view of a lock utilized on a portion of the tailboard in an alternate embodiment.
Figure 8:
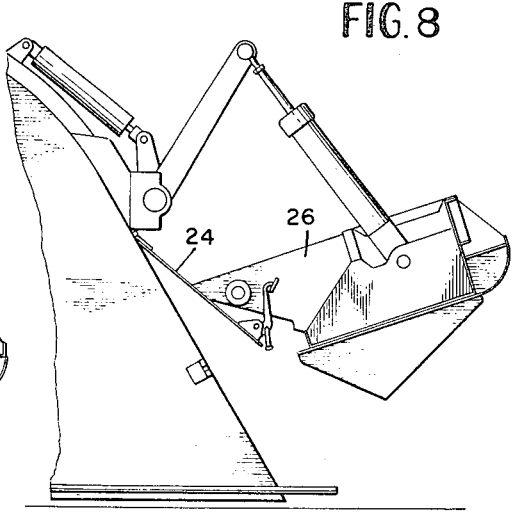
FIG. 8 is a side elevation view similar to FIG. 3 showing the vibratory tailboard of the alternate embodiment in a more fully raised position.

In an alternate embodiment, the base plate 32 comprises an intermediate tailboard portion 24 which is disposed between and interconnects the hood 14 and the vibratory tailboard 26. The intermediate tailboard portion 24 is provided with hinges 28 for connecting it to a transverse rib 30 on the hood. The intermediate tailboard portion 24 is also provided with a releasable lock 118 at each side thereof and this lock is shown in more detail in FIG. 7. The releasable lock includes a bracket 120 mounted on plate 36 and supporting a lever 122 about pivotal mount 124. The lever has a handle 126 and carries a locking member 128 having an enlarged head 130. The body of locking member 128 will pass through an open ended slot 134 in keeper bracket 132 attached to hood side 16 while the head 130 will not. The arrangement is an overcenter lock so that the handle when down on the surface of the hood locks the intermediate tailboard portion to form an extension of the hood and the handle when raised will free the locking member from the keeper to allow the intermediate tailboard portion to pivot upwardly as shown in FIG. 8.

The operation is believed to be apparent from the foregoing but a brief resume' will now be given. The pulverizer-mixer of this invention may be operated as a conventional pulverizer-mixer of the prior art, in which case the tailboard assembly 26 would be adjusted as desired and the vibrator mechanism 46 would not be operated. If desired to aerate the soil, the entire tailboard assembly is raised to the position of FIG. 3 or FIG. 8 in the alternate embodiment. It will be readily apparent that more effective and complete aeration may be attained in the alternate embodiment employing the hinged intermediate tailboard portion 24. In addition, this embodiment provides better access to the tines 12 for inspection or changing. However, substantially the same advantages may be attained in the preferred embodiment simply by shortening the extension 136 on arm 42, thereby allowing the tailboard assembly 26 to pivot through a greater angle.

For compacting the fluff, the tailboard assembly 26 would be set to the position desired, the vibratory mechanism 46 would be operated, and the load applied to the tailboard would be provided partially by the weight of the hood 14 and partially by the fluid motor 90. A compaction of up to 80% may be obtained on one pass with this arrangement. The lower portion of the tailboard has compaction plate 48 extending at a low angle for better compaction, and the vibratory and surcharge forces imposed thereon act substantially vertically and from directly above.

While the invention has been particularly shown and described with reference to particular embodiments thereof, it will be understood by those skilled in the art that various changes in form and details may be made therein without departing from the spirit and scope of the invention.

What is claimed is:

1. In a traveling soil pulverizer-mixer having a body with ground engaging wheels, an engine carried by the body, a soil pulverizing mixing rotor carried by the body and driven by the engine, a hood connected to the frame and enclosing the rotor except for having an elevated rear transverse edge; a tailboard of rigid construction having an upper forward portion and a lower rear ground engaging portion, pivot means connecting the rear transverse edge of the hood to the forward upper portion of the tailboard so that the tailboard can assume various inclined positions relative to the ground, power driven vibratory means secured to said tailboard to vibrate the same with a vertical component, resilient shock absorbing means interposed between the hood and tailboard adjacent the pivot means, and a resilient tailboard positioning and load applicator means connected to the lower rear portion of the tailboard to position the tailboard about the pivot means and apply a preselected surcharge on worked soil thereunder to compact the same by vibrtaory action.

2. The invention of claim 1 wherein the resilient tailboard positioning and load applicator means includes a power cylinder and a shock absorber in a power linkage.

3. The invention of claim 1 wherein a portion of said hood including said rear transverse edge comprises an intermediate tailboard portion hingedly attached by its upper transverse edge to said hood.

4. The invention of claim 3 including releasable locking means securing said intermediate tailboard portion in position to form a rigid extension of said hood.

5. The invention of claim 4 wherein said tailboard includes an extension on the upper forward portion thereof, said extension positioned to bear on said intermediate tailboard portion and raise the same after the lower rear portion of said tailboard has been raised a predetermined extent, provided said locking means is released.

References Cited

UNITED STATES PATENTS

| | | | |
|---|---|---|---|
| 2,368,331 | 1/1945 | Seaman | 94—40 |
| 2,473,770 | 6/1949 | Seaman | 94—40 |
| 2,757,588 | 8/1956 | Pollitz | 94—48 |
| 3,262,378 | 7/1966 | Schrimper | 94—46 |
| 3,359,875 | 12/1967 | Reider | 94—46 X |

JACOB L. NACKENOFF, Primary Examiner

U.S. Cl. X.R.

94—44